Figure 1:
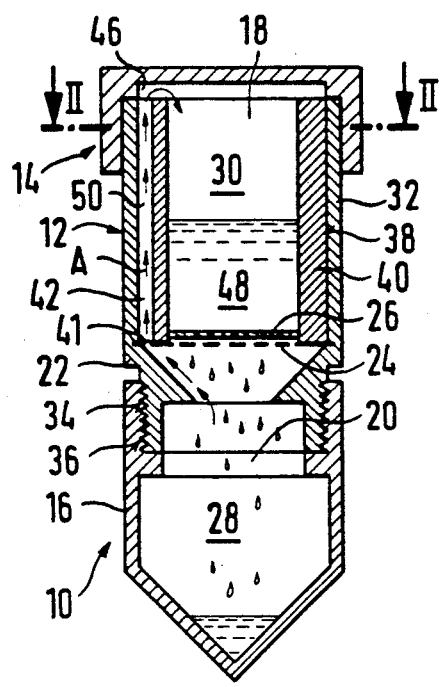

United States Patent [19]

Szabados

[11] Patent Number: 5,104,533
[45] Date of Patent: Apr. 14, 1992

[54] FILTRATION UNIT WITH PRESSURE COMPENSATION

[76] Inventor: Andreas Szabados, Otto-Heilmann-Str. 2, D-8022 Grünwald, Fed. Rep. of Germany

[21] Appl. No.: 445,612
[22] PCT Filed: Jul. 8, 1988
[86] PCT No.: PCT/EP88/00614
§ 371 Date: Feb. 22, 1990
§ 102(e) Date: Feb. 22, 1990
[87] PCT Pub. No.: WO89/00288
PCT Pub. Date: Jan. 12, 1989

[30] Foreign Application Priority Data

Jul. 8, 1987 [DE] Fed. Rep. of Germany ....... 3722563

[51] Int. Cl.$^5$ ............................................. B01D 35/00
[52] U.S. Cl. .................. 210/257.1; 210/335; 210/455; 210/472; 422/101
[58] Field of Search ............... 210/188, 436, 445, 455, 210/472, 477, 489, 136, 252, 255, 252.1, 335; 422/101; 604/406

[56] References Cited

U.S. PATENT DOCUMENTS

| | | | |
|---|---|---|---|
| 3,300,051 | 1/1967 | Mitchell | 210/489 |
| 3,512,940 | 5/1970 | Shapiro | 422/101 |
| 3,608,736 | 9/1971 | Wong | 210/477 |
| 3,832,141 | 8/1974 | Haldopoulos | 422/101 |
| 4,439,319 | 3/1984 | Rock | 210/489 |
| 4,485,015 | 11/1984 | Smith | 210/455 |
| 4,525,276 | 6/1985 | Toda et al. | 210/472 |
| 4,615,694 | 10/1986 | Raines | 604/406 |
| 4,675,110 | 6/1987 | Fay | 210/472 |

FOREIGN PATENT DOCUMENTS

| | | | |
|---|---|---|---|
| 3403077 | 9/1985 | Fed. Rep. of Germany | 210/472 |
| 3427114 | 1/1986 | Fed. Rep. of Germany | 210/489 |
| 160 | of 1854 | United Kingdom | 210/472 |
| 746805 | 6/1954 | United Kingdom | 210/472 |

*Primary Examiner*—Robert A. Dawson
*Assistant Examiner*—Joseph Drodge
*Attorney, Agent, or Firm*—Toren, McGeady & Associates

[57] ABSTRACT

A filtration unit, especially for medical, microbiological, biochemical, immunological or molecular biology specimens. The filtration unit includes a specimen-receiving vessel (12), a filtrate vessel (16) and a filter member (22) containing a filter element (24, 26) arranged between the specimen-receiving vessel and filtrate vessel. In order to obtain an automatic pressure compensation in a closed system the filtrate vessel inner space (28) is connected with the specimen-receiving vessel inner space (30) by at least one pressure compensation channel (50) bypassing the filtration liquid (48). The pressure compensation channel extends axially along a side wall of the specimen-receiving vessel and connects a first discharge point in the filtrate vessel inner space above the maximum filtrate level with a second discharge point in the specimen-receiving vessel inner space above the maximum filtration fluid level while bypassing the filtration unit. The channel ends in the region of a cap for opening into the inner space of the specimen-receiving vessel.

8 Claims, 1 Drawing Sheet

FILTRATION UNIT WITH PRESSURE COMPENSATION

DESCRIPTION

The invention is directed to a filtration unit, especially for medical, microbiological, biochemical, immunological or molecular biology specimens with a specimen-receiving vessel, a filtrate vessel and a filter member containing a filter element arranged between the specimen-receiving vessel and the filtrate vessel, wherein in order to avoid escape of liquid during the filtration process the filtrate vessel is connected with the specimen-receiving vessel by the filter element, however it is sealed towards the outside and possibly the specimen-receiving vessel is also sealed toward the outside.

Such a filtration unit is known (FIGS. 3 to 8 of the DE-A-34 27 114). The filtration in the closed system made poss by this known arrangement has the great advantage, that on the one hand a contamination of the environment by the filtrate as well as by the filtration liquid and the filtered particles deposited upon the filter element is avoided, including a possible contamination and unpleasant odor in the environment caused by escaping gases; on the other hand an impairment of the filtration liquid and the filtrate by pollution from the outside and above all by entry of oxygen contained in air is to begin with avoided The filtration however proceeds quite slowly in many cases in the known arrangement, since the filtrate housing inner space is connected with the specimen-receiving vessel inner space exclusively by the filter element acted upon on its top side by the filtration liquid and is otherwise sealed towards the outside. In the course of the filtration process the filtrate vessel inner space is increasingly filled with filtrate. The hereby displaced quantity of gas, which originally completely filled the filtrate housing inner space, is subjected to the overpressure impeding the filtration process. With the only possible pressure compensation through the filter element and the filtration liquid column resting upon the filter element.

The U.S. Ser. No. 33 00 051 shows a filtration unit, where the specimen-receiving vessel as well as the filtrate vessel are designed with a ventilation aperture discharging into the environment. A liquid escape from the filtrate vessel can therefore not be excluded. The filtrate can also be impaired by pollution from the outside and above all by entry of oxygen contained in the air.

The task of the invention consists in providing for an acceleration of the filtration process by facilitating the pressure compensation in a filtration unit of the previously mentioned type where at least the filtrate vessel is completely sealed toward the outside.

This task is solved by at least one pressure compensation channel which connects a first discharge point in the filtrate vessel inner space above the maximum filtrate level with a second discharge point in the specimen-receiving vessel inner space above the maximum filtration liquid level while bypassing the filtration liquid. The pressure compensation channel provides directly for the desired pressure compensation, wherein the filtrate vessel and if required also the specimen-receiving vessel can be sealed more or less hermetically towards the outside.

In order to at least render more difficult the penetration of filtrate into the respective pressure compensation channel while maintaining simple producibility, it is proposed that the pressure compensation channel be penetrated by a segment of the filter element not covered by filtration liquid. This arrangement is also very favorable from the production technology point of view, since separate recesses for the pressure compensation channel in the filter element are avoided. In a filter element comprising a backup screen for a filtering disk the pressure compensation channel is penetrated merely by the backup screen.

A production technology-wise especially favorable embodiment form of the invention is characterized by designing the side wall of the specimen-receiving vessel to be double-walled and by having the double wall intermediate space form a segment of the at least one pressure compensation channel. Thi embodiment form is also particularly sturdy mechanically, which is important above all if the filtration unit is used in connection with a high speed centrifuge.

As an alternative hereto the side wall of the specimen-receiving vessel can also be designed with at least one axially extending bore which forms a segment of the pressure compensation channel. It is especially advantageous from the production technology point of view, if the specimen-receiving vessel is provided with an insert part comprising at least the one axial bore. This insert part can then be provided with axial through-bores.

According to the cited DE-A-34 27 114 the filter member can be designed as a separate part in the form of a cylindrical annulus, where on the one hand the specimen-receiving vessel and on the other hand the filtrate vessel are to be threaded in from both sides with their respective vessel aperture. The filtrate vessel and the specimen-receiving vessel are then connected exclusively with each other and accordingly are sealed towards the outside. Deviating therefrom the specimen-receiving vessel can also be designed in one piece with the filter member, wherein in that case only the filtrate vessel has to be screwed into the filter member. The specimen-receiving vessel is then open at its end remote from the filtrate vessel, in order to enable the filtrate liquid to be poured in. After this filling process the opening can then be closed by a cap or cover. In this case it is proposed that the second discharge point be arranged in the region between the cap or cover and the side wall of the specimen-receiving vessel. For this purpose the inner wall portion can accordingly be shortened at its upper end in case of a double-walled design. In a preferred alternative the cap is provided with a recess in a region of the cap sde edge of the inner wall portion of the double wall side wall or of the cap side edge of the insert part. This results again in a minimum fabrication cost while maintaining a maximum distance of the second discharge point from the filtration liquid level Instead of a pressure compensation channel, at least one through aperture with a check valve opening towards the outside or the inside can be arranged in the side wall of the filtrate vessel and/or the specimen-receiving vessel according to an alternative, especially easy to fabricate embodiment form. The through aperture then forms the previously mentioned venting channel or ventilation channel.

In another alternative embodiment form a through aperture is provided in the side wall of the filtrate and-/or of the specimen-receiving vessel, which aperture is closedoff by means of a filter portion essentially only permeable to gas.

In the following the invention is described with particularity with the help of the drawing depicting preferred embodiment examples thereof.

Figure 2:
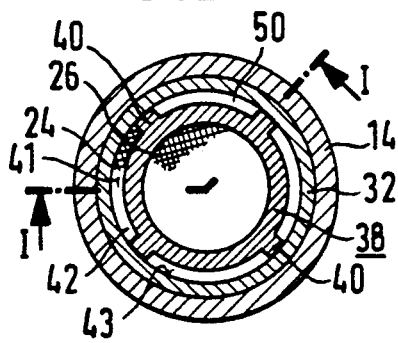
Figure 3:
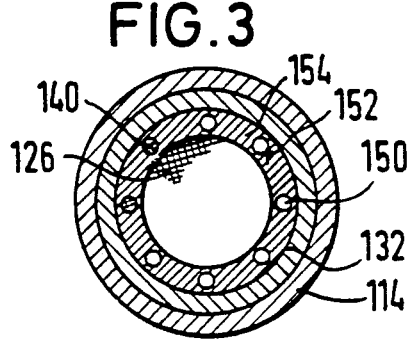
Figure 4:
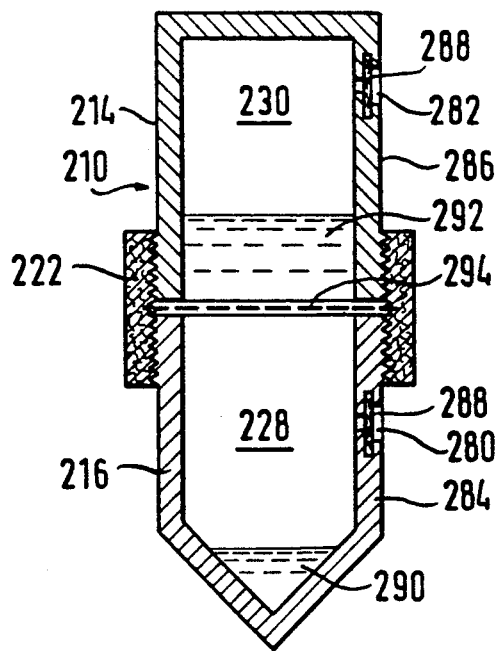

It is shown on:

FIG. 1 a side view of a first embodiment form of a filtration unit in the invention sectioned along the line I—I in FIG. 2;

FIG. 2 a horizontal section along the line II—II of the arrangement in FIG. 1;

FIG. 3 a horizontal section of a second embodiment form corresponding to FIG. 2; and FIG. 4 a side view of a section of a third embodiment form.

The filtration unit 10 depicted in simplified form in the FIGS. 1 and 2 comprises three separately manipulatable parts, namely a specimen-receiving vessel 12 with a vessel aperture 18, which can be sealed by means of a cap 14, and which can be placed upon the vessel aperture 20 of a filtrate vessel 16 (in the embodiment example shown it is threaded on). The specimen-receiving vessel is designed in one piece with the filter member 22, which in the shape of a hollow cylindrical annulus serves as a carrier or support for a filter element. In the depicted embodiment example the filter element comprises a backup screen 24 arranged in a radial plane and completely covering the inside crosssection of the filter member, as well as a circular filter disk 26 resting upon the backup screen. As an alternative the filter member can also be designed as a separately handleable or manipulatable part similar to FIGS. 3 to 7 of the DE-OS 34 27 114, at whose upper axial end the specimen-receiving vessel can be fastened to start off with its vessel aperture, especially being threaded thereon.

The filtration unit 10 enables a filtration in a closed system, since the (only) vessel aperture 20 of the filtering vessel is sealed or closed by the specimen-receiving vessel threaded into the filtrate vessel; this with a connection of the vessel inside space 28 of the filtrate vessel 16 to the vessel inner space 30 of the specimen-receiving vessel by means of the described filter member 22; the vessel aperture 18 of the specimen-receiving vessel can again be closed or sealed by means of the cap 18. During the filtration process in this closed system the filtrate liquid in the filtrate vessel increasingly displaces the air- or gas quantity originally completely occupying the inside space 28. This entails a corresponding increase of the gas pressure. This corresponds to a lowering of the gas pressure in the vessel inner space 30 of the specimen-receiving vessel 12. The gas pressure compensation by means of the passage of gas through the filter disk 26 is impeded and, at least after deposition of a finely distributed layer of particles, which have to be filtered out, upon the filter disk 26 during the filtration process, it is impeded to such a degree, that the filtration is considerably slowed down, if not completely interrupted. Pressure compensation channels, which bypass this filtration liquid in the specimen-receiving vessel 12, are provided in order to enable the pressure compensation to proceed without hindrance within the closed system. For this purpose the specimen-receiving vessel 12 is designed with a double wall side wall. The outer wall portion 32 in the shape of a hollow cylinder transits directly into the also hollow cylindrical filter member 22, which is equipped with an external thread 34 for threading-on a matching inside thread 36 at the upper end of the filtrate vessel 16. The inner wall portion 38, which is concentric to the outer wall portion, is held at a uniform spacing to the inner circumferential surface 33 of the outer wall portion 32 by means of webs 40 distributed across the outer circumference of said inner wall portion 38. These webs 40 are integral with the inner wall portion 38 in the embodiment example depicted; they can however be designed to be integral with the outer wall portion 32 or they can be separate parts. Thus an intermediate space 42 exists between the two wall portions 32, 38.

The inner wall portion 38 is seated upon the backup screen 24 as is shown in FIG. 1 The backup screen 24 extends however up to the outer wall portion 14 and is embedded or cast into the transitional region between the wall portion 14 and the annularly-shaped filter member 22.

In case of a separate design of the filter member the outer wall portion would accordingly be connected with the annularly-shaped filter member in a sealing manner, with the lower edge of the thinner wall portion resting upon the backup screen.

In any case the annular space formed between the wall portions 32 and 38 is bounded towards the bottom by a flat outer circular ring segment 41 of the backup screen 24.

The double wall-intermediate space 42 is connected with the inner space 28 of the filtrate vessel 16 through this screen segment 41. A corresponding connection exists also to the inner space 30 of the specimen-receiving vessel 12 and indeed preferably with entry of air into the inner space 30 in the region between the cap 14 and the upper edge of the vessel 12. This can be achieved by appropriate recesses or bores or shortening of the inner wall portion 38 or, as depicted, by an appropriate recess 46 in the cap 14, which in case of a put-in-place, especially threaded-on cap 14 provides a connection between the intermediate space 42 and inner space 30.

The filtration unit 10 in FIGS. 1 and 2 can be handled in the following manner:

The filtration liquid 48 is filled into the specimen-receiving vessel 12 connected to the filtrate vessel 16. Subsequently the cap 14 is put in place and the unit 10 is inserted into an appropriate stand with the cap 14 pointing upwards, so that the filtration occurs under the influence of gravity. The unit 10 can also be placed into a high speed centrifuge for accelerating the filtration process. The gas pressure compensation required during the transfer of the liquid from the inside space 30 through the filter disk 26 into the inner space 28 occurs through the intermediate space 42, as is indicated by the flow arrows A in FIG. 1. The channels 50 extending in axial direction formed between the axially extending webs 40 thus connect the spaces 28 and 30 bypassing the filtration liquid 48 in the inner space of the inner wall portion 38. Prior to entry into the intermediate space 42 the gas must pass through the circular ring-shaped segment 40 of the backup screen 24, which prevents penetration of this liquid into the generally quite narrow intermediate space 42. A reduction of the free gas passage cross-section by the liquid in the intermediate space 42 or even an obduration of the channels 50 is hereby eliminated Conversely, the undesirable entry of unfiltered filtration liquid in the opposite direction is prevented by the channels 50 to the filtration vessel inner space 28 with corresponding impairment of the filtrate in case of incorrect handling of the filtration unit.

While in the embodiment form in FIGS. 1 and 2 the pressure compensation channels 50 are formed by the intermediate space in the double walled vessel wall of the specimen-receiving vessel, one obtains the pressure compensation channels 150 in the alternative embodiment form depicted in FIG. 3 by providing of axially parallel bores 152 in the vessel wall or in an insert part 154 which is to be inserted into the vessel These bores 152 can for instance already be molded in during the fabrication of the insert part 154 or they can be subsequently drilled. The advantage of a separate insert part 154 lies above all in that the lower end of the bores 152 can again be easily closed off by an outer flat annular ring segment 140 of the backup screen molded into the outer wall portion 132 . The filter disk 126 is again matched with its external diameter to the inner diameter of the insert part 154 and is placed upon the backup screen. The filtration in the closed system with the cap 114 threaded-on proceeds again in accordance with the first embodiment example in FIGS. 1 and 2. After the filtration the filtration vessel 16 can be closed with a special cover equally as the bottom end of the specimen-receiving vessel by threading a cap upon the external thread 34.

In the third embodiment form of the invention designated with 210 depicted in FIG. 4 through apertures 280 and 282 are provided respectively in the side wall 284 of the filtrate vessel or the side wall 286 of the specimen-receiving vessel 216 instead of the pressure compensation channel connecting the two vessel inner spaces 230 and 228 with each other; these through apertures are provided in the filtrate vessel 216 as well as in the specimen-receiving vessel 214. Each through aperture is closed by a disk-shaped filter portion 288 which is essentially only permeable for gases, thus it is impermeable for the filtrate liquid 290 or the filtration liquid 292 above the filter element 294. Both through apertures 280 and 282 are located as far as possible towards the top, thus in such a way that these cannot be reached by the respective liquid either in case of a maximum level of the filtration liquid 292 or of the filtrate liquid 290. In this manner the desired pressure compensation is again attained during the filtration process while maintaining the closed system.

According to FIGS. 3 to 8 of the DE-OS 34 27 114 the filter member 222 in the embodiment form in FIG. 4 is designed separately in the shape of a hollow cylindrical ring comprising the screen element 294 in the region of its axial longitudinal center; the upper end of the specimen-receiving vessel 214 can to begin with be screwed into th upper end of said hollow cylindrical ring and correspondingly the filtrate vessel 216 can be threaded from the bottom into said hollow cylindrical ring. In an alternative hereto a single piece design of the filter member with the specimen-receiving vessel can be provided also in this embodiment form in FIG. 4 analogously to FIG. 1.

I claim:

1. A closed filtration unit (10), especially for medical, microbiological, biochemical, immunological or molecular biology specimens, with a specimen-receiving vessel (12) having an inner space (30), a filtrate vessel (16) having an inner space (28) and a filter member (22) containing a filter element, arranged between said specimen-receiving vessel (12) and said filtrate vessel (16), said specimen-receiving vessel (12) having an axis and two axial ends, said filter element being provided at one of said two axial ends and a region with a cover or cap (14) for closing said specimen-receiving vessel (12) being provided at the other end of said two axial ends, wherein in order to avoid escape of liquid the filtrate vessel (16) is connected with the specimen-receiving vessel (12) by the filter element the filtrate vessel otherwise being sealed, the specimen-receiving vessel (12) provided with at least one pressure compensation channel (50; 150) axially extending along a side wall of said specimen-receiving vessel, the pressure compensation channel connecting a first discharge point in the filtrate vessel inner space (28) above a maximum filtrate level with a second discharge point in the specimen-receiving vessel inner space (30) above a maximum filtration fluid level while bypassing the filtration fluid, said at least one channel (50; 150) ending in the region of said cover or cap (14) for opening into said inner space of said specimen-receiving vessel (12), and wherein the at least one pressure compensation channel (50; 150) is penetrated by a segment (41; 140) of the filter element not covered by filtration fluid (48).

2. Filtration unit according to claim 1 wherein in a filter element comprising a backup screen (24) for a filtering disk (26; 126), the at least one pressure compensation channel (50; 150) is penetrated only by the backup screen (24).

3. Filtration unit claim 1, wherein the side wall of the specimen-receiving vessel (114) has at least one axially extending bore (152) which forms one segment of at least one pressure compensation channel (150).

4. Filtration unit according to claim 3 wherein the speciment-receiving vessel (114) is provided with an insert part (154) comprising at least one axial bore.

5. Filtration unit according to claim 4, wherein the insert part (154) has a cap side edge, and wherein the cap (14) is provided with a recess (46) at the cap side edge of the insert part (154).

6. Filtration unit according to claim 1 wherein the specimen-receiving vessel (12) forms one single piece with the filter member (22).

7. A closed filtration unit (10), especially for medical, microbiological, biochemical, immunological or molecular biology specimens, with a specimen-receiving vessel (12) having an inner space (30), a filtrate vessel (16) having an inner space (28) and a filter member (22) containing a filter element, arranged between said specimen-receiving vessel (12) and said filtrate vessel (16), said specimen-receiving vessel (12) having an axis and two axial ends, said filter element being provided at one of said two axial ends and a region with a cover or cap (14) for closing said specimen-receiving vessel (12) being provided at the other end of said two axial ends, wherein in order to avoid escape of liquid the filtrate vessel (16) is connected with the specimen-receiving vessel (12) by the filter element the filtrate vessel otherwise being sealed, the specimen-receiving vessel (12) provided with at least one pressure compensation channel (50; 150) axially extending along a side wall of said specimen-receiving vessel, the pressure compensation channel connecting a first discharge point in the filtrate vessel inner space (28) above a maximum filtrate level with a second discharge point in the specimen-receiving vessel inner space (30) above a maximum filtration fluid level while bypassing the filtration fluid, said at least one channel (50; 150) ending in the region of said cover or cap (14) for opening into said inner space of said specimen-receiving vessel (12), and wherein the side wall of the specimen-receiving vessel (14) is double walled and a double wall intermediate space (42) forms a segment of the at least one pressure compensation channel (50).

8. Filtration unit according to claim 7, wherein the double side wall includes an inner wall portion (38) which has a cap side edge, and wherein the cap (14) is provided with a recess (46) at the cap side edge of the inner wall portion (38) of the double wall side wall.

* * * * *